US012762154B2

(12) United States Patent
Sasaki

(10) Patent No.: US 12,762,154 B2
(45) Date of Patent: Oct. 13, 2026

(54) INFORMATION PROCESSING APPARATUS

(71) Applicant: Kioxia Corporation, Tokyo (JP)

(72) Inventor: Shinichi Sasaki, Ota (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/883,738

(22) Filed: Sep. 12, 2024

(65) Prior Publication Data

US 2025/0278413 A1 Sep. 4, 2025

(30) Foreign Application Priority Data

Mar. 4, 2024 (JP) ................................ 2024-032504

(51) Int. Cl.
*G06F 16/28* (2019.01)
*G06F 16/2453* (2019.01)

(52) U.S. Cl.
CPC ...... *G06F 16/285* (2019.01); *G06F 16/24532* (2019.01)

(58) Field of Classification Search
CPC ............ G06F 16/285; G06F 16/24532; G06F 2216/03; G06F 16/2465; G06F 16/35; G06F 16/2219; G06F 16/334; G06F 16/245; G06F 16/244; G06F 16/278; G06F 16/24568
USPC .......................................................... 707/737
See application file for complete search history.

(56) References Cited

U.S. PATENT DOCUMENTS 8,515,956 B2 8/2013 Pendar
8,913,152 B1 12/2014 Carceroni et al.
2003/0112662 A1* 6/2003 Tanzawa ............ G11C 16/0408 365/185.11
2009/0271433 A1* 10/2009 Perronnin ............... G06F 17/16
2015/0254325 A1* 9/2015 Stringham .......... G06F 16/9535 707/737
2016/0070780 A1* 3/2016 Taljanovic .......... G06F 16/2379 707/737
2017/0097980 A1* 4/2017 Ishii ....................... G06N 20/00
(Continued)

OTHER PUBLICATIONS

Lu et al., Article: "An analog online clustering circuit in 130nm CMOS"; 2013 IEEE Asian Solid-State Circuits Conference (A-SSCC) (2013, pp. 177-180) Univ. of Tennessee, Knoxville, TN, USA. (Year: 2013).*

(Continued)

*Primary Examiner* — Evan Aspinwall
(74) *Attorney, Agent, or Firm* — Oblon, McClelland, Maier & Neustadt, L.L.P.

(57) ABSTRACT

An information processing apparatus comprises a cluster division unit that equally distributes first data to two or more clusters while overlapping some of the first data among first data and repeats distribution to new two or more clusters until the number of the first data included in each of the distributed clusters becomes a predetermined limit number or less, a centroid calculation unit that calculates a centroid value of each of clusters finally distributed by the cluster division unit, a first determination unit that compares a center of each of the clusters with second data and determines a cluster having a centroid value most similar to the second data as a search cluster, and a selection unit that compares each of the first data included in the search cluster with the second data and selects one or more predetermined numbers of the first data similar to the second data.

21 Claims, 14 Drawing Sheets

2: STORAGE UNIT

(56) References Cited

U.S. PATENT DOCUMENTS

| | | | | |
|---|---|---|---|---|
| 2019/0065519 | A1* | 2/2019 | Ohtsuji | G06F 16/1748 |
| 2021/0064928 | A1 | 3/2021 | Narisetty et al. | |
| 2021/0397610 | A1* | 12/2021 | Singh | G06F 16/2425 |
| 2024/0220488 | A1* | 7/2024 | Bordawekar | G06F 16/243 |
| 2025/0037423 | A1* | 1/2025 | Noro | G06V 40/168 |
| 2025/0173866 | A1* | 5/2025 | Negishi | G16H 30/20 |

OTHER PUBLICATIONS

Garzon et al., Article: "AM4: MRAM Crossbar Based CAM/TCAM/ACAM/AP for In-Memory Computing"; E. Garzón, M. Lanuzza, A. Teman, and L. Yavits, IEEE Journal on Emerging and Selected Topics in Circuits and Systems, vol. 13, No. 1, pp. 408-421, 2023 (Year: 2023).*

Jeong, Y.; Lee, J.; Moon, J.; Shin, J. H.; Lu, W. D. K means Data Clustering with Memristor Networks. Nano Lett. 2018, 18, 4447-4453, DOI: 10.1021/acs.nanolett.8b01526. (Year: 2018).*

Jeong et al., "K-means Data Clustering with Memristor Networks", Nano Letters, vol. 18, 2018, pp. 4447-4453.

Garzón et al., "$AM^4$: MRAM Crossbar Based CAM/TCAM/ACAM/AP for In-Memory Computing", IEEE Journal on Emerging and Selected Topics in Circuits and Systems, vol. 13, No. 1, Mar. 2023, pp. 408-421.

Wei et al., "Analog Computing in Memory (CIM) Technique for General Matrix Multiplication (GEMM) to Support Deep Neural Network (DNN) and Cosine Similarity Search Computing using 3D AND-type NOR Flash Devices", IEEE, 2022, pp. 787-790.

Bao et al., "Toward memristive in-memory computing: principles and applications", Frontiers of Optoelectronics, vol. 15, No. 23, 2022, 25 pages.

* cited by examiner

2: STORAGE UNIT

MCA: MEMORY CELL ARRAY

SECOND DATA Q= 1, 1, 0, 1

FIRST DATA K1= 1, 0, 0, 1

FIRST DATA K2= 0, 1, 1, 0

FIRST DATA K3= 1, 0, 1, 0

FIRST DATA K4= 1, 0, 1, 1

SECOND DATA Q= 1, 1, 0, 1

FIRST DATA K1= 1, 0, 0, 1

FIRST DATA K2= 0, 1, 1, 0

FIRST DATA K3= 1, 0, 1, 0

FIRST DATA K4= 1, 0, 1, 1

SECOND DATA Q= 1, 1, 0, 1

FIRST DATA K1= 1, 0, 0, 1

FIRST DATA K2= 0, 1, 1, 0

FIRST DATA K3= 1, 0, 1, 0

FIRST DATA K4= 1, 0, 1, 1

SECOND DATA Q= 1, 1, 0, 1

FIRST DATA K1= 1, 0, 0, 1

FIRST DATA K2= 0, 1, 1, 0

FIRST DATA K3= 1, 0, 1, 0

FIRST DATA K4= 1, 0, 1, 1

INFORMATION PROCESSING APPARATUS

CROSS REFERENCE TO RELATED APPLICATIONS

This application is based upon and claims the benefit of priority from the prior Japanese Patent Application No. 2024-032504, filed on Mar. 4 2024, the entire contents of which are incorporated herein by reference.

FIELD

Embodiments described herein relate generally to an information processing apparatus.

BACKGROUND

In vector data search, in order to find data similar to a given search query, data is expressed as a vector, and a similarity between the vectors is calculated. The similarity is usually calculated by a host device or a central processing unit (CPU) by reading data from a storage device.

By calculating the similarity with a computing in memory (CIM), the cost of data for transferring to the host device or the CPU can be reduced, and the processing load on the host device or the CPU can be reduced. The CIM performs operation using the memory cell array. Therefore, in order to maximize the operation efficiency, it is desirable to cause the number of parallel processes of data to match the number of bit lines of a memory cell array. When the total number of pieces of data is larger than the number of bit lines, it is required to divide the data into a plurality of clusters.

The k-means method is generally used for cluster division. However, in the k-means method, the cluster size is not constant. Therefore, if cluster division is performed so that each cluster size is equal to or less than the total number of bit lines, the size becomes smaller than the total number of bit lines depending on the cluster, and the operation efficiency of the CIM decreases.

DETAILED DESCRIPTION

In general, according to the embodiment, an information processing apparatus comprises processing circuitry. The processing circuitry is configured to:

- equally distribute first data to two or more clusters while overlapping some of the first data among a plurality of pieces of first data and repeats distribution to new two or more clusters until the number of pieces of the first data included in each of the distributed clusters becomes equal to or less than a predetermined limit number;
- calculate a centroid value of each of the finally distributed clusters;
- compare a center of each of the plurality of clusters with second data and determines a cluster having a centroid value most similar to the second data as a search cluster; and
- compare each of the plurality of pieces of first data included in the search cluster with the second data to select one or more predetermined numbers of the first data similar to the second data.

Hereinafter, embodiments of an information processing apparatus are described with reference to the drawings. Although main components of the information processing apparatus are mainly described below, the information processing apparatus may have components and functions that are not illustrated or described. The following description does not exclude components and functions that are not illustrated or described.

Figure 1:
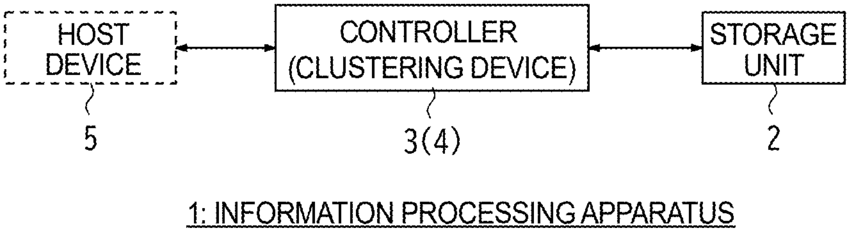
FIG. 1 is a block diagram illustrating a schematic configuration of an information processing apparatus according to an embodiment.

FIG. 1 is a block diagram illustrating a schematic configuration of an information processing apparatus 1 according to an embodiment. As illustrated in FIG. 1, an information processing apparatus 1 according to an embodiment includes a storage unit 2 and a controller 3.

The storage unit 2 is, for example, a nonvolatile memory. The nonvolatile memory is, for example, a NAND flash memory. Since the type of the nonvolatile memory that can be used as the storage unit 2 is not limited, a cross point-type memory or the like may be used. Examples of the cross point-type memory include a resistive random access memory (ReRAM) using a resistance change element as a memory cell, a magnetoresistive random access memory (MRAM) using a magnetoresistive element, and a phase change memory, and any of the memories can be applied to the storage unit 2 according to the present embodiment. In addition, the storage unit 2 may use a volatile memory such as a dynamic random access memory (DRAM) or a static random access memory (SRAM).

The controller 3 controls writing and reading of data to and from the storage unit 2. In addition, the controller 3 has a function of a clustering device 4. As described below, the clustering device 4 performs similarity determination as to whether the plurality of pieces of first data are similar to the second data according to an instruction from a host device 5. The controller 3 (clustering device 4) transmits the result of the similarity determination to the host device 5.

The host device 5 supplies the plurality of pieces of first data and second data described above to the controller 3 to instruct the controller 3 to perform the similarity determination and receives a result of the similarity determination by the controller 3. In FIG. 1, the host device 5 is provided outside the information processing apparatus 1, but the host device 5 may be provided inside the information processing apparatus 1.

Both the first data and the second data in the present embodiment are multi-dimensional data and can be expressed by vectors. In the present specification, first data including multi-dimensional data may be referred to as a first vector having a large number of elements, and second data including multi-dimensional data may be referred to as a second vector having a large number of elements. The number of elements of the first vector is equal to the number of elements of the second vector. The similarity between the first data and the second data can be determined by an inner product value of the first vector and the second vector. A larger inner product value indicates a higher similarity.

When searching for first data having high similarity to second data from among a plurality of pieces of first data, the information processing apparatus 1 according to the present embodiment classifies the plurality of pieces of first data into a plurality of clusters obtained by collecting similar persons, determines a cluster most similar to the second data as a search cluster from among the plurality of pieces of first data, determines similarity between all the first data and the second data in the search cluster by, for example, the above-described inner product value, and searches for the first data similar to the second data.

Figure 2:
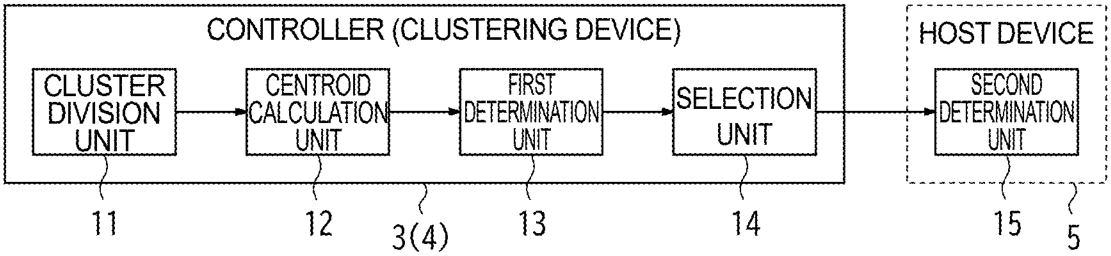
FIG. 2 is a functional block diagram of a controller.

FIG. 2 is a functional block diagram of the controller 3 and the host device 5 and illustrates a block configuration of the clustering device 4. The clustering device 4 included in the controller 3 includes a cluster division unit 11, a centroid calculation unit 12, a first determination unit 13, and a selection unit 14. The host device 5 includes a second determination unit 15. The processing operation of the clustering device 4 can be performed by processing circuitry such as a processor.

The cluster division unit 11 equally distributes the first data K to two or more clusters while overlapping some of first data K among the plurality of pieces of first data K and repeats distribution to new two or more clusters until the distributed number of pieces of first data K included in each cluster becomes equal to or less than a predetermined limit number. In the present specification, the first data K may be referred to as key data or key vector data. A cluster is an aggregate of one or more pieces of key data, and each cluster includes a plurality of similar pieces of key data.

Although the cluster division unit 11 may equally divide the plurality of pieces of first data K into three or more clusters, an example in which the cluster division unit 11 equally divides the first data K into two clusters while overlapping some of the first data K among the plurality of pieces of first data K is described below. Both of the two clusters have some of first data K in a duplicate manner.

In this manner, the cluster division unit 11 repeatedly performs the process of dividing all the first data K in one cluster into two clusters while allowing duplication for each cluster, and finally the number of pieces of the first data K included in one cluster is set to be equal to or less than the predetermined limit number. The predetermined limit number is a number corresponding to the number of first wirings (for example, bit lines) as described below and more specifically, for example, is the number of pieces of data equal to or less than a page size.

The centroid calculation unit 12 calculates the centroid value of each of the plurality of clusters finally distributed by the cluster division unit 11. The centroid value is an average value of all the first data K in the corresponding cluster. More specifically, an average value of each bit of all the first data K is obtained. This is equivalent to calculating the average value for each element of all the first vectors.

The first determination unit 13 compares the centroid value of each of the plurality of clusters with second data Q and determines a cluster having a centroid value most similar to the second data Q as a search cluster.

The selection unit 14 compares each of the plurality of pieces of first data K included in the search cluster with the second data Q and selects one or more predetermined numbers of pieces of first data K similar to the second data Q. As described below, the individual piece of first data K is identified by a label. The selection unit 14 selects the first data K and the corresponding label. The label corresponding to the first data K selected by the selection unit 14 is transmitted from the controller 3 to the host device 5.

The second determination unit 15 in the host device 5 determines a label similar to the second data Q from among a predetermined number of labels corresponding to the first data K selected by the selection unit 14.

Figure 3:
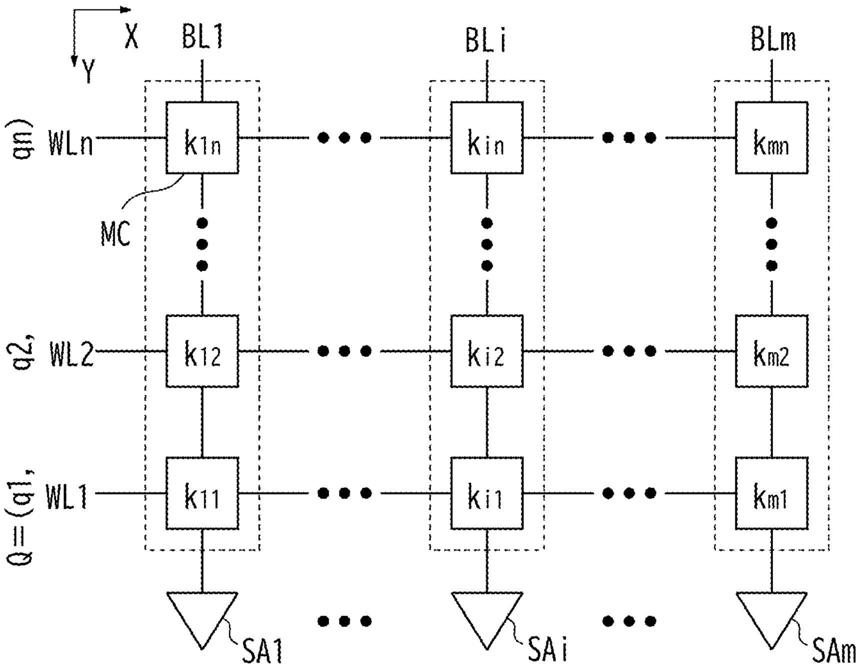
FIG. 3 is a block diagram illustrating a specific configuration of a storage unit in FIG. 1.

FIG. 3 is a block diagram illustrating a specific configuration of the storage unit 2 in FIG. 1. As illustrated in FIG. 3, the storage unit 2 includes a plurality of memory cells MC arranged in a first direction (hereinafter, referred to as a row direction) X and a second direction (hereinafter, referred to as a column direction) Y, a plurality of first wirings (hereinafter, referred to as bit lines) BL1 to BLm each extending in the column direction Y and arranged in the row direction X at predetermined intervals, a plurality of second wirings (hereinafter, referred to as word lines) WL1 to WLn each extending in the row direction X and arranged in the column direction Y at predetermined intervals, and a plurality of sense amplifiers SA1 to SAm connected to one end sides of the plurality of bit lines BL1 to BLm.

The storage unit 2 according to the present embodiment performs a product-sum operation of multiplying and adding each bit (each dimension) of the first data K and the corresponding bit (each dimension) of the second data Q. This product-sum operation is equivalent to calculating an inner product value of each element of the first vector and the corresponding element of the second vector. The multiplication (calculation of the inner product value) described above is performed in each memory cell MC, and the above-described product-sum calculation is performed on each bit line.

Each of the plurality of memory cells MC stores the first data K (key data, first vector). As described above, the first data K is multi-dimensional data and includes a plurality of elements. The storage unit 2 stores all elements of one piece of first data K in the plurality of memory cells MC (broken-line frame in FIG. 3) arranged in the column direction Y. In the example of FIG. 3, m pieces of first data K arranged in the row direction X are stored in the plurality of memory cells MC.

The number of dimensions (the number of elements of the second vector) n of the second data Q matches the number of dimensions (the number of elements of the first vector) n of the first data K. In the example of FIG. 3, n word lines WL1 to WLn for transmitting the second data Q are arranged in the column direction Y, and each of the word lines WL1 to WLn is connected to the corresponding memory cell MC among the plurality of memory cells MC arranged in the column direction Y.

Each bit of the first data K (each element of the first vector) is supplied to the n memory cells MC connected to the corresponding bit line via the corresponding bit line. Therefore, data of each dimension of m pieces of first data K is stored in the m×n memory cells MC via m bit lines BL1 to BLm.

The n memory cells MC arranged in the column direction Y are connected to the common bit line BL, and the m memory cells MC arranged in the row direction X are connected to the common word line WL.

In the plurality of (m×n) memory cells MC, multiplication of each bit indicating whether each bit of the first data K (each element of the first vector) matches the corresponding bit of the second data Q (corresponding element of the second vector) is performed in parallel, and the plurality of bit lines BL1 to BLm are set to a voltage corresponding to a value (inner product value) obtained by adding multiplication results of the bits. The voltages of the plurality of bit lines BL1 to BLm are sensed by the plurality of sense amplifiers SA1 to SAm.

The n memory cells MC arranged in the column direction Y are connected to each of the m bit lines BL1 to BLm arranged in the row direction X. Therefore, each bit line supplies a voltage corresponding to a signal obtained by performing wired-OR on the multiplication result between the bits of the corresponding n memory cells MC to the sense amplifier SA. As described above, each of the bit lines BL1 to BLm has a voltage corresponding to a signal obtained by adding the results of multiplication between the bits of the n memory cells MC arranged in the column direction Y by the wired OR, and these voltages are sensed by the sense amplifiers SA1 to SAm.

In FIG. 3, the m pieces of first data K are K={(k11, k12, . . . , k1n), . . . , (ki1, ki2, . . . , kin), . . . , (km1, km2, . . . , kmn)}, and the second data Q is Q=(q1, . . . , qi, . . . , qn). In this case, the bit line BL1 has a voltage corresponding to an inner product value of k11×q1+k12×q2+ . . . +k1n×qn. Similarly, the bit lines BL2 to BLm have voltages according to the inner product values of the respective elements of the corresponding first data and second data.

The plurality of word lines WL1 to WLn arrayed in the column direction Y may be sequentially driven, and the multiplication results of the bits for each row may be sequentially transmitted through the m bit lines BL1 to BLm. In this case, a storage circuit that temporarily stores a result of multiplication between bits may be provided between the plurality of memory cells MC and the corresponding bit line.

Figure 4:
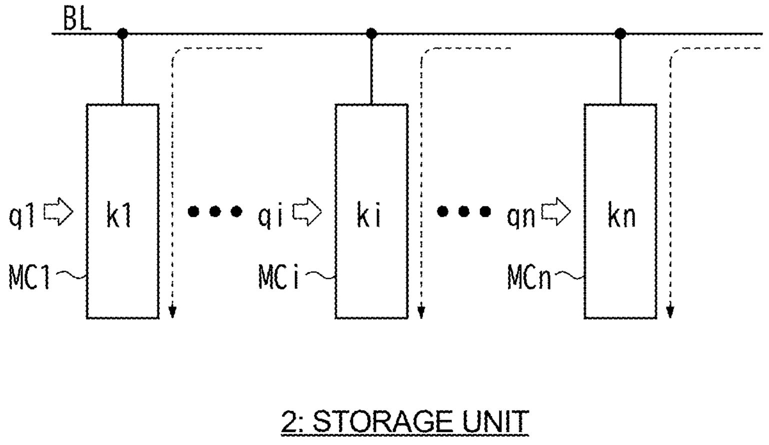
FIG. 4 is a diagram illustrating multiplication between bits performed in a storage unit and a product-sum operation of adding multiplication results.

FIG. 4 is a diagram illustrating multiplication between bits performed in the storage unit 2 and a product-sum operation of adding multiplication results. FIG. 4 illustrates the plurality of memory cells MC1 to MCn (hereinafter, collectively referred to as memory cells MC) connected to one bit line. In FIG. 3, the extending direction of each bit line is the longitudinal direction of the paper surface. However, in FIG. 4, for convenience, the extending direction of the bit line is the lateral direction of the paper surface.

As illustrated in FIG. 3, n (n is an integer of 2 or more) memory cells MC1 to MCn are connected to one bit line. Each of the memory cells MC calculates the similarity between the first data K and the second data Q and draws a current corresponding to the similarity from the bit line to the memory cell MC. As the similarity is higher, the current drawn from the bit line to the memory cell MC increases, and the voltage of the bit line further decreases. As described above, in the circuit of FIG. 4, a current corresponding to the similarity between the first data K and the second data Q flows through the bit line, and the voltage of the bit line changes.

Since the sense amplifier SA senses the voltage of the bit line, the similarity between the first data K and the second data Q can be detected by the voltage of the bit line.

The specific configuration of the memory cell MC illustrated in FIGS. 3 and 4 varies depending on the type of memory configuring the storage unit 2. For example, in the case of the NAND flash memory, each memory cell MC illustrated in FIGS. 3 and 4 is configured with a string in which a plurality of memory cell transistors are connected in series.

Figure 5:
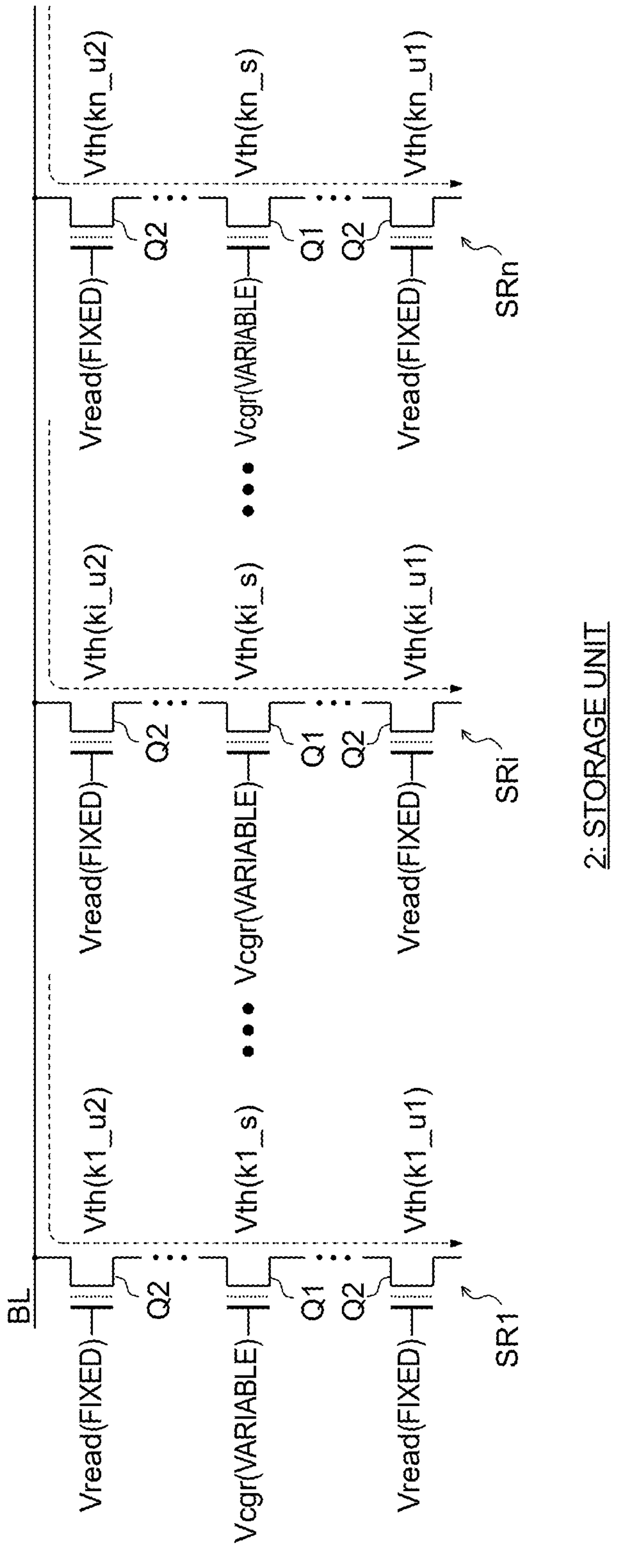
FIG. 5 is a circuit diagram illustrating an example of a storage unit in which a plurality of strings are connected to one bit line.

FIG. 5 is a circuit diagram illustrating an example of the storage unit 2 in which a plurality of strings SR1 to SRn are connected to one bit line. Each of the strings SR1 to SRn is configured by connecting a plurality of memory cell transistors in series. The strings SR1 to SRn in FIG. 5 correspond to, for example, a plurality of memory cells in one broken line portion in FIG. 3. Hereinafter, the memory cell transistor is simply referred to as a transistor. Different word lines are connected to the gates of the plurality of transistors in the string SR. In a normal memory cell array, the plurality of word lines WL1 to WLn are commonly connected to the plurality of strings SR1 to SRn. FIG. 5 illustrates an example in which the word line WL1 is connected to the gate of a transistor Q1 in the string SR1, the word line WLi is connected to the gate of the transistor Q1 in the string SRi, and the word line WLn is connected to the gate of the transistor Q1 in the string SRn. In FIG. 5, the voltages of the word lines WL1 to WLn connected to the gates of the transistors Q1 in the strings SR1 to SRn are all Vcgr. Vcgr is a voltage corresponding to the value of each element of the second vector corresponding to the second data Q.

In FIG. 5, the threshold voltages Vth (k1_s), . . . , Vth (ki_s), . . . , and Vth (kn_s) of the transistors Q1 in the strings SR1 to SRn are set by the values of the elements of the first vector corresponding to the first data K.

In addition to the transistor Q1, a plurality of transistors Q2 are connected in series to the strings SR1 to SRn. The gates of these transistors Q2 are set to a predetermined fixed voltage Vread. Also, the threshold voltage of each transistor Q2 is set to predetermined voltages Vth (k1_u1), Vth (k1_u2), . . . , Vth (ki_u1), Vth (ki_u2), . . . , Vth (kn_u1), and Vth (kn_u2).

By providing the gate voltage Vread at a voltage level considerably larger than the threshold voltage of each transistor Q2 in the strings SR1 to SRn, each transistor Q2 can be turned on.

In the present embodiment, among the plurality of transistors Q1 and Q2 connected in series in each of the strings SR1 to SRn, the transistor Q2 is set to be always on. In addition, the transistor Q1 of each string SR causes a current corresponding to a product of corresponding elements of the first data (first vector) K and the second data (second vector) Q to flow from the bit line BL to the corresponding string SR.

Figure 6:
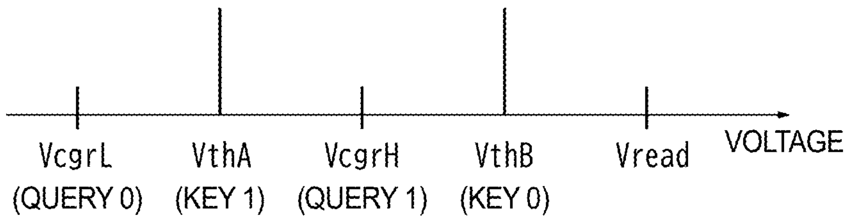
FIG. 6 is a diagram illustrating a relationship between a gate voltage and a threshold voltage of a transistor in each string of FIG. 5.

FIG. 6 is a diagram illustrating the relationship between the gate voltages of the transistors Q1 and Q2 and the threshold voltage in each string SR of FIG. 5. As illustrated in FIG. 6, voltages are Vread, a threshold voltage VthB of the transistor Q1 when the first data K=0, a gate voltage VcgrH of the transistor Q1 when the second data Q=1, a threshold voltage VthA of the transistor Q1 when the first data K=1, and a gate voltage VcgrL of the transistor Q1 when the second data Q=0 in order from the highest voltage level.

Therefore, for example, in a case where the first data K=1 and the second data Q=1, a current flows through the transistor Q1. Meanwhile, when the first data K=0 and the second data Q=0, no current flows through the transistor Q1.

The sum of the currents flowing through the plurality of strings SR1 to SRn is a current corresponding to the inner product value of the first vector K and the second vector Q, and this current flows through the bit line BL. Therefore, the current flowing through the bit line BL changes according to the inner product value of the first vector K and the second vector Q. As the inner product value increases, the sum of the currents flowing through the plurality of strings SR1 to SRn and the current flowing through the bit line BL increase, and the voltage level of the bit line BL further decreases.

The storage unit 2 of FIG. 5 can calculate the inner product of the first vector K corresponding to the first data K and the second vector Q corresponding to the second data Q. Each of the strings SR1 to SRn causes a current corresponding to a product of corresponding elements of the first vector K and the second vector Q to flow. Therefore, the sum of the currents flowing through each of the strings SR1 to SRn flows through the bit line, and the voltage of the bit line decreases according to the sum. The current flowing through the bit line and the voltage of the bit line are values corresponding to an inner product value of the first vector K and the second vector Q.

Figure 7:
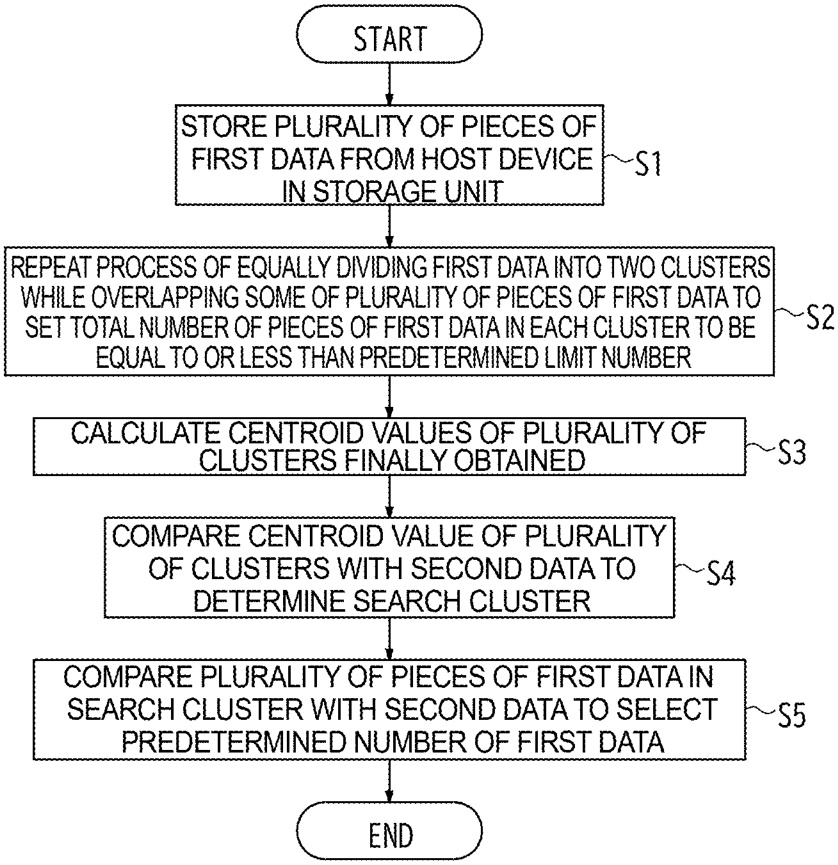
FIG. 7 is a flowchart illustrating a processing operation of the information processing apparatus according to the present embodiment.

FIG. 7 is a flowchart illustrating processing operation of the information processing apparatus 1 according to the present embodiment. The process of the flowchart of FIG. 7 is performed by the controller 3 using the storage unit 2 in accordance with an instruction from the host device 5 of FIG. 1. As described above, the information processing apparatus 1 according to the present embodiment is characterized in that the similarity determination of multi-dimensional data described above is performed by a hardware circuit including a CIM.

First, the host device 5 sends the plurality of pieces of first data K (key data) to the controller 3. The controller 3 stores the plurality of pieces of first data K from the host device 5 in the storage unit 2 (step S1).

Next, the cluster division unit 11 in the controller 3 performs clustering for equally dividing the first data K into two clusters, while overlapping some of the plurality of pieces of first data K, and stores the first data K and the corresponding label in the storage unit 2 for each cluster (step S2). Equally dividing means equalizing the number of pieces of the first data K included in each cluster. When the total number of the first data K in each of the clusters after the division exceeds the predetermined limit number, the first data K in each of the clusters after the division is equally divided into two new clusters while some of the first data K is overlapped. Such a division process into two clusters is repeatedly performed, and the total number of the first data K in each cluster is finally set to be equal to or less than a predetermined limit number.

Next, the centroid calculation unit 12 in the controller 3 calculates the centroid value of each of the plurality of clusters finally obtained in step S2. The centroid value is multi-dimensional data similarly to the first data K and is stored in the storage unit 2 (step S3). In the process of step S2, a plurality of clusters are generated hierarchically, and in step S3, the centroid values of the plurality of clusters in the lowest hierarchy are calculated. As described above, the centroid calculation unit 12 calculates the average value of bits (elements) of each piece of first data K included in each cluster as the centroid value.

Next, the first determination unit 13 and the storage unit 2 in the controller 3 compare the centroid value of each cluster calculated in step S3 with the second data Q (query data) to determine a search cluster (step S4). The comparison process in step S4 may be performed in the storage unit 2. As illustrated in FIGS. 4 and 5, in the storage unit 2, the centroid value is stored in each string SR as the key data. The second data Q is input to each string SR via a word line. The current flowing through the bit line and the voltage of the bit line change according to the similarity between the centroid value of each cluster and the second data Q. The first determination unit 13 determines, as a search cluster, a cluster having a centroid value at which similarity is maximized, based on the voltage of the bit line detected by the sense amplifier SA.

Next, the selection unit 14 in the controller 3 compares each of the plurality of pieces of first data K (key data) included in the search cluster with the second data Q (query data) and selects one or more predetermined numbers of pieces of first data K similar to the second data Q (step S5). The process in step S5 can be performed by the storage unit 2. In this case, by using the plurality of pieces of first data K included in the search cluster stored in the storage unit 2 and inputting the second data Q via the word line, the selection unit 14 detects the similarity by the voltage of the bit line as illustrated in FIGS. 4 and 5. Alternatively, the process in step S5 may be performed by the host device 5. In this case, the controller 3 reads the plurality of pieces of first data K included in the search cluster from the storage unit 2 and sends the plurality of pieces of first data K to the host device 5. The host device 5 performs similarity determination between the plurality of pieces of first data K and the second data Q included in the search cluster and selects a predetermined number of pieces of first data K in descending order of similarity. When selecting a predetermined number of first data K, the selection unit 14 selects labels corresponding to the predetermined number of first data K.

Next, the second determination unit 15 in the host device 5 determines, by majority vote, a label similar to the second data Q from among the predetermined number of labels corresponding to the first data K selected by the selection unit 14.

Figure 8:
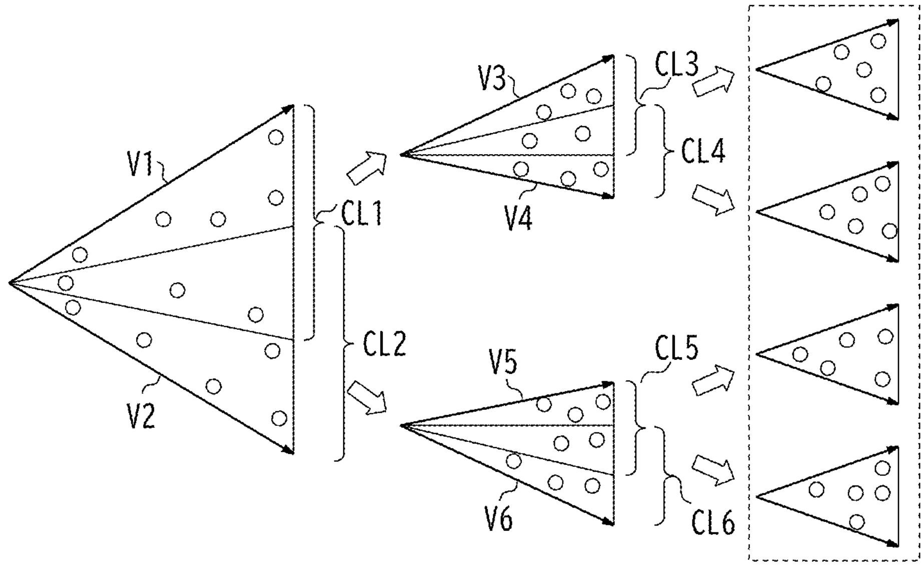
FIG. 8 is a diagram illustrating a process of step S2 in FIG. 7.

FIG. 8 is a diagram illustrating the process of step S2 in FIG. 7. The cluster division unit 11 divides the cluster into two clusters CL1 and CL2 by, for example, non-negative matrix factorization (NMF). NMF is a data conversion method using unsupervised learning. The cluster division unit 11 equally divides a plurality of elements existing in a region between the two vectors V1 and V2 into two clusters CL1 and CL2 while overlapping some elements by the NMF. The cluster CL1 includes first data of only the cluster CL1 and first data overlapping the cluster CL2. Similarly, the cluster CL2 includes the first data of only the cluster CL2 and the first data overlapping with the cluster CL1.

When the number of pieces of the first data included in each of the two clusters CL1 and CL2 exceeds the predetermined limit number, the cluster division unit 11 equally divides the first data into two new clusters CL3 and CL4 while overlapping some of the plurality of pieces of first data included in the cluster CL1 and similarly equally divides the first data into two new clusters CL5 and CL6 while overlapping some of the plurality of pieces of first data included in the cluster CL2. In this manner, clustering in which two divided clusters have some elements in an overlapping manner is called soft clustering.

In the present embodiment, when clustering the plurality of pieces of first data K, soft clustering of equally dividing the first data K into two clusters while overlapping some of the first data K using, for example, the NMF is performed. When the number of pieces of the first data K included in each cluster after the division exceeds the predetermined limit number, each cluster after the division is further equally divided into two clusters while some of the first data K are overlapped as illustrated in FIG. 8. By repeating such clustering, the number of pieces of the first data K included in each cluster after the division can be finally set to be equal to or less than the predetermined limit number.

The predetermined limit number is a number corresponding to the number of bit lines in the storage unit 2. In a more specific example, the predetermined limit number is the number of pieces of data equal to or smaller than a page size determined according to the number of bit lines of the storage unit 2. The page size is a unit of performing writing and reading to and from the plurality of memory cells MC in the storage unit 2. By setting the number of pieces of the first data K included in the final cluster to be equal to or smaller than the page size, it is possible to perform the similarity determination of the plurality of pieces of first data K and second data Q included in the final cluster in parallel, and to efficiently perform the similarity determination in a short period of time.

In order to effectively use the storage unit 2, it is desirable that the finally divided cluster includes the first data K of the number of pieces as close as possible to the page size.

The first determination unit 13 determines, as a search cluster, a cluster having a centroid value most similar to the second data Q among the plurality of clusters (broken-line frames in FIG. 8) in which the number of pieces of the first data K is equal to or less than a predetermined limit number.

The method by which the cluster division unit 11 performs soft clustering is not necessarily limited to the NMF, and soft clustering may be performed by any another method.

Figure 9:
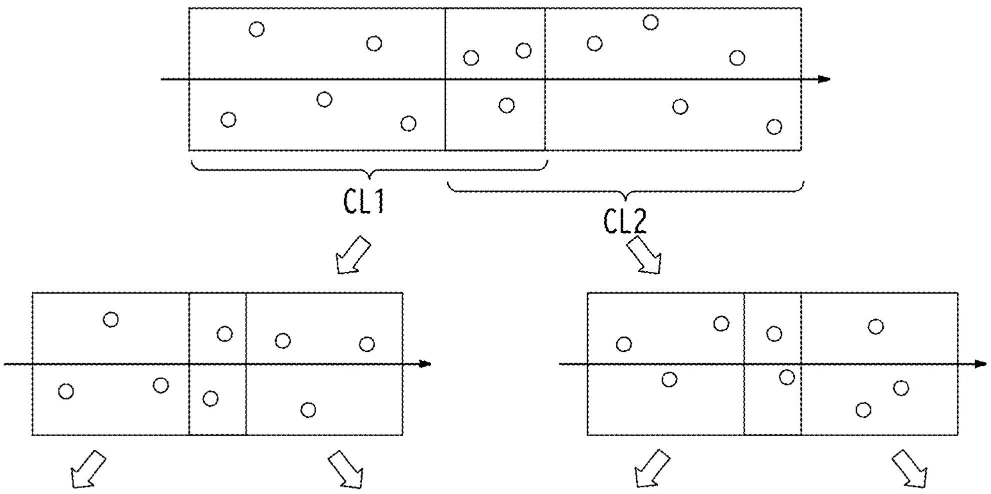
FIG. 9 is a diagram illustrating an example in which a cluster division unit performs soft clustering by PCA.

FIG. 9 is a diagram illustrating an example in which the cluster division unit 11 performs soft clustering by principal component analysis (PCA). In the PCA, the principal component analysis is performed on all the first data K, and the first data K is divided into two clusters CL1 and CL2 according to the size (coefficient) of V1 that is the first principal component. At this time, the two clusters CL1 and CL2 hold some of the first data K in an overlapping manner. When the number of pieces of the first data K included in each of the clusters CL1 and CL2 after the division exceeds the predetermined limit number, the process of performing the principal component analysis for each of the clusters CL1 and CL2 after the division and allocating new two clusters according to the coefficient of the first principal component is repeated, and the number of pieces of the first data K included in each cluster is finally set to be equal to or less than the predetermined limit number.

Even when either the NMF of FIG. 8 or the PCA of FIG. 9 is used, the first data K can be divided into two clusters while overlapping some of the first data K.

In FIGS. 3 to 5 described above, an example of calculating the inner product value of the first data K and the second data Q by the string SR using the NAND memory cell MC is described, but the inner product value may be calculated by using a nonvolatile memory other than the NAND memory. Hereinafter, an example of calculating the inner product value by using a resistance change-type memory (also referred to as a cross point-type memory) is described.

Figure 10:
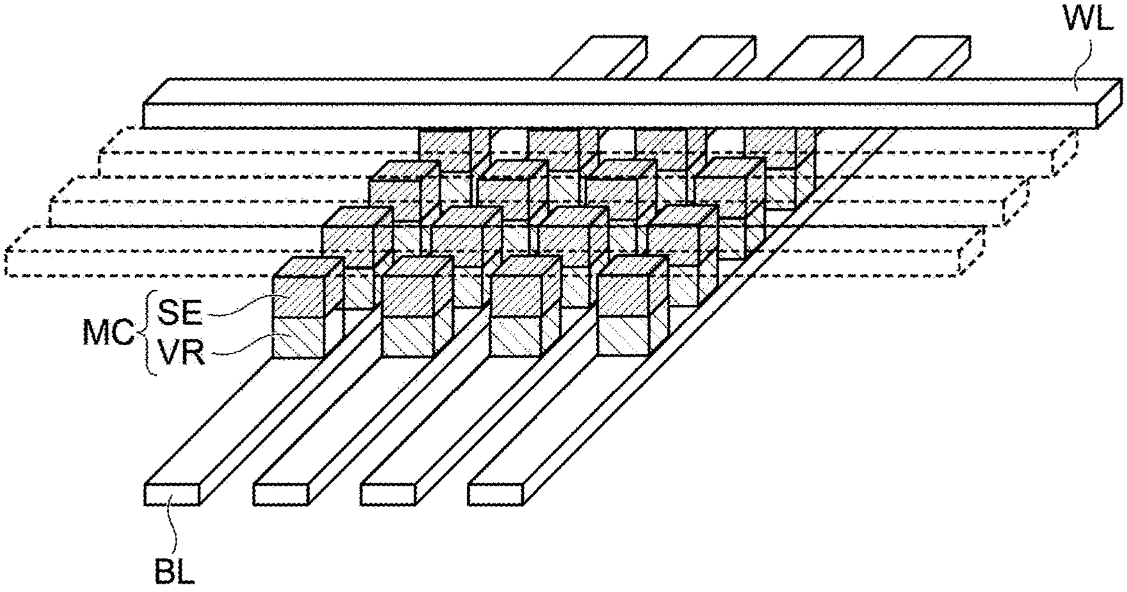
FIG. 10 is a perspective view schematically illustrating memory cells, bit lines, and word lines included in a memory cell array in a cross point-type memory.

FIG. 10 is a perspective view schematically illustrating the memory cells MC, the bit lines BL, and the word lines WL included in a memory cell array MCA in the cross point-type memory.

As illustrated in FIG. 10, for example, the plurality of bit lines BL extend in the same direction at intervals, and the plurality of word lines WL extend above the bit lines BL at intervals in a direction orthogonal to the direction in which the bit lines BL extend. Then, the plurality of memory cells MC are arranged at the intersections of the plurality of bit lines BL and the plurality of word lines WL, respectively. As a result, the cross point-type memory cell array MCA in which the plurality of memory cells MC are arranged on the matrix in plan view is configured.

FIG. 10 illustrates an example in which the bit lines BL and the word lines WL are arranged in each one layer, and the memory cells MC are arranged in one layer therebetween, but the present invention is not limited thereto. The number of layers in which the memory cells MC are arranged may be further increased, and correspondingly, the number of layers of the bit lines BL and/or the word lines WL may be further increased. For example, the plurality of bit lines BL1 extending in a direction orthogonal to the direction in which the word lines WL extend may be further provided at intervals on the plurality of word lines WL in FIG. 10, and the plurality of memory cells MC may be further arranged at intersections of the plurality of word lines WL and the plurality of upper bit lines BL. In this case, the memory cells MC have two layers, and the wiring layers (the layer of the bit lines BL and the layer of the word lines WL) have three layers. In addition, the bit lines BL and the word lines WL may be interchanged with each other.

Figure 11:
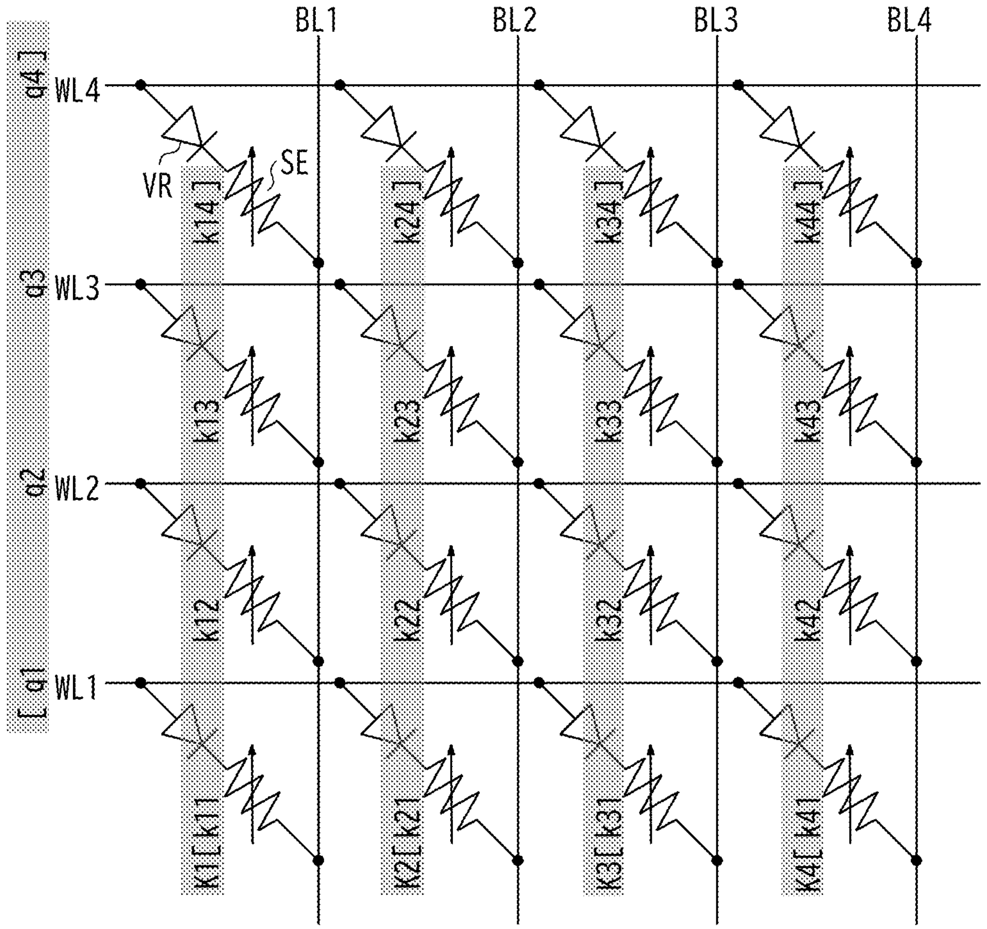
FIG. 11 is a diagram schematically illustrating an example of a circuit configuration of the memory cell array illustrated in FIG. 10.

FIG. 11 is a diagram schematically illustrating an example of a circuit configuration of the memory cell array MCA illustrated in FIG. 10. Each memory cell MC is connected between one corresponding word line WL and one corresponding bit line BL. The memory cell MC includes, for example, a resistance change element VR and a switch element SE. Further, the memory cell MC is not limited to a resistance change-type element.

The switch element SE functions as a rectifying element having a rectifying function. The switch element SE may be a bidirectional rectifying element.

In the cross point-type memory, the plurality of word lines WL1 to WLn for supplying the second data Q (query data) are driven one by one so that the voltage of the word line does not affect other word lines.

The resistance change element VR can be in a low resistance state and a high resistance state. The resistance change element VR stores 1-bit data by using a difference in resistance state between the low resistance state and the high resistance state. In the example of FIG. 11, four pieces of first data (key data) K=(K1, K2, K3, K4) are stored in each memory cell MC via the bit lines BL1 to BL4, and a current corresponding to a comparison result for each bit with the second data (query data) Q=(q1, q2, q3, q4) supplied via the word lines WL1 to WL4 flows to the bit lines BL1 to BL4. Each piece of key data K includes four bits, and each bit is stored in four memory cells MC arranged in the column direction. In the example of FIG. 11, each bit of the key data K1 is (k11, k12, k13, k14) in order from the least significant side, each bit of the key data K2 is (k21, k22, k23, k24) in order from the least significant side, each bit of the key data K3 is (k31, k32, k33, k34) in order from the least significant side, and each bit of the key data K4 is (k41, k42, k43, k44) in order from the least significant side.

For example, each memory cell MC has a low resistance when the corresponding bit of the key data is 1 and has a high resistance when the corresponding bit of the key data is 0. Note that the relationship between the value of the bit of the key data and the resistance state of the memory cell MC is any relationship.

The word lines WL1 to WL4 are sequentially driven at Vhigh. When the query data corresponding to the word line driven at Vhigh is 1, the bit lines BL1 to BL4 are voltages indicating the matching detection result for each bit of the key data and the query data. Meanwhile, when the query data corresponding to the word line driven at Vhigh is 0, the bit lines BL1 to BL4 have voltages obtained by inverting the matching detection results of the key data and the query data per bit. Therefore, by sensing the voltages of the bit lines BL1 to BL4 and confirming the query data of the word line driven at Vhigh, the similarity search between the first data K and the second data Q can be performed.

FIGS. 12 to 15 are diagrams illustrating an example of calculating similarity between the plurality of pieces of first data K (key data) and second data Q (query data) supplied via a word line by using a cross point-type memory.

Figure 12:
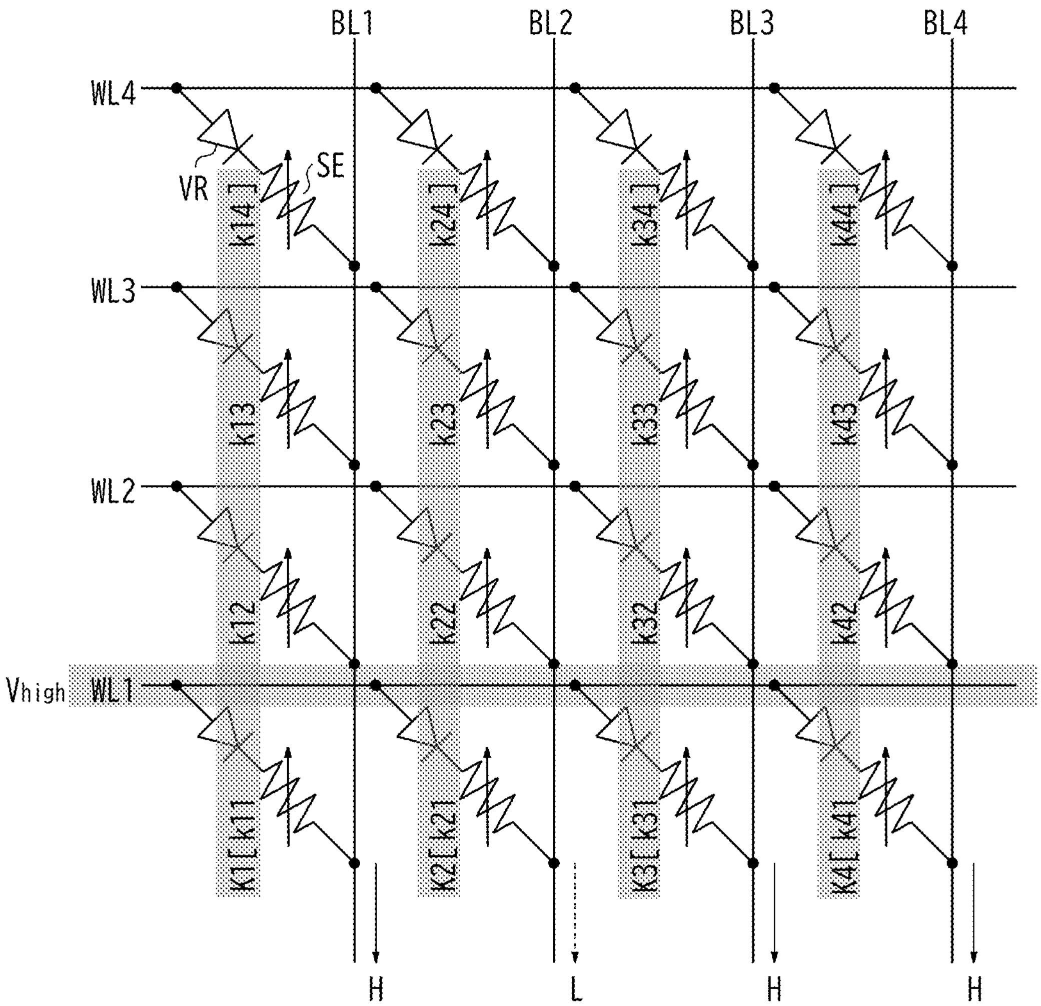
FIG. 12 is a diagram illustrating an example of driving a word line WL1 of FIG. 11.

FIG. 12 illustrates an example of driving the word line WL1. In this case, the high-level voltage Vhigh is applied to the word line WL1. Among the four memory cells MC connected to the word line WL1, a current flows through the memory cell MC in which the resistance change element is in the low resistance state, and the corresponding bit line becomes a high level. In the example of FIG. 12, since the least significant bits of the first data K1 to K4 are (1, 0, 1, 1), the logic of the bit lines BL0 to BL3 is (H, L, H, H). As described above, in FIG. 12, the similarity determination between the least significant bits of the plurality of pieces of first data K and the least significant bits of the second data Q is performed, and the result of the similarity determination is output to the bit lines BL0 to BL3. Among the bit lines BL0 to BL3, a bit line that becomes a high level (H) indicates that corresponding bits of the first data K and the second data Q match each other, and a bit line that becomes a low level (L) indicates that corresponding bits of the first data K and the second data Q do not match each other. The example of FIG. 12 indicates that least significant bits b0 of the first data K1, K3, and K4 match data q1 of a least significant bit b1 of the second data Q.

Figure 13:
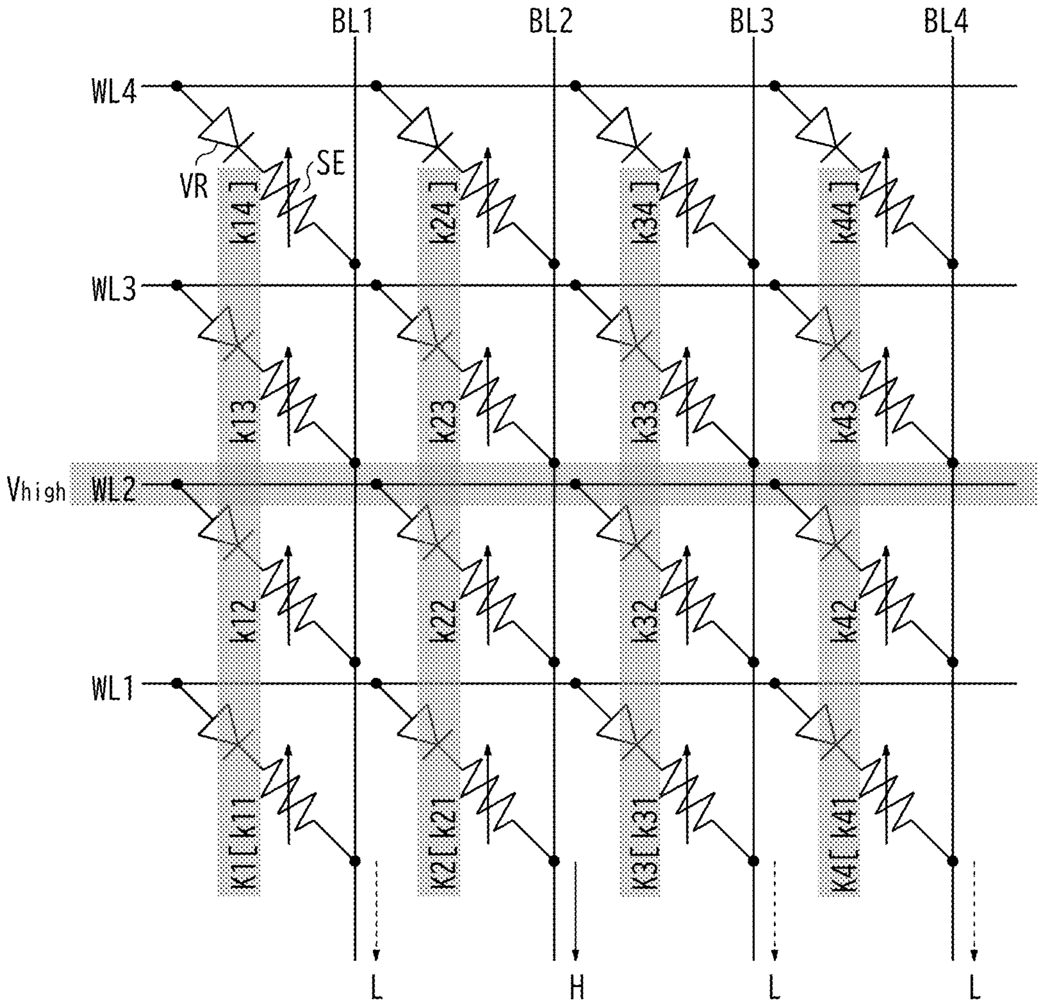
FIG. 13 is a diagram illustrating an example of driving a word line WL2 of FIG. 11.

After the word line WL1 is driven, the word line WL2 is driven as illustrated in FIG. 13. In this case, the high-level voltage Vhigh is applied to the word line WL2. In the example of FIG. 13, since the bits b1 of the first data K1 to K4 are (0, 1, 0, 0), respectively, the logics of the bit lines BL0 to BL3 become (L, H, L, L). Therefore, the bit b1 of the first data K2 matches the bit b1 of the second data Q, and the bits b1 of the other first data K1, K3, and K4 do not match the bit b1 of the second data Q.

Figure 14:
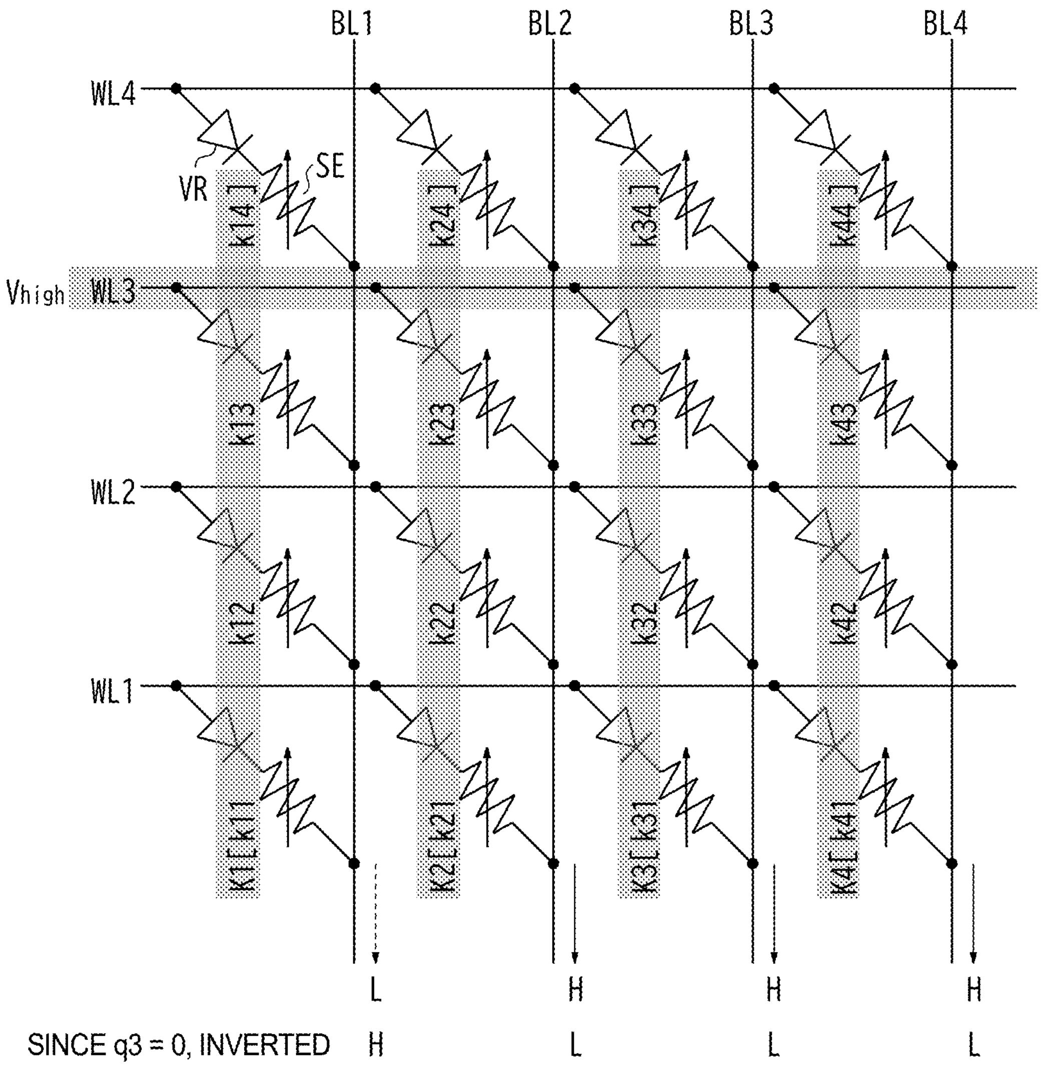
FIG. 14 is a diagram illustrating an example of driving a word line WL3 of FIG. 11.

After the word line WL2 is driven, the word line WL3 is driven as illustrated in FIG. 14. In this case, the high-level voltage Vhigh is applied to the word line WL3. In the example of FIG. 14, since bits b2 of the first data K1 to K4 are (0, 1, 1, 1), respectively, the logics of the bit lines BL0 to BL3 become (L, H, H, H). Meanwhile, since the bit b2 of the second data Q is 0, the logics (H, L, L, L) obtained by inverting the logic of the bit lines BL0 to BL3 indicate the result of the similarity determination between the bits b2 of the first data K and the second data Q. As described above, in the example of FIG. 14, the bit b2 of the first data K1 matches the bit b2 of the second data Q, and the bits b2 of the other first data K2 to K4 do not match the bit b2 of the second data Q.

Figure 15:
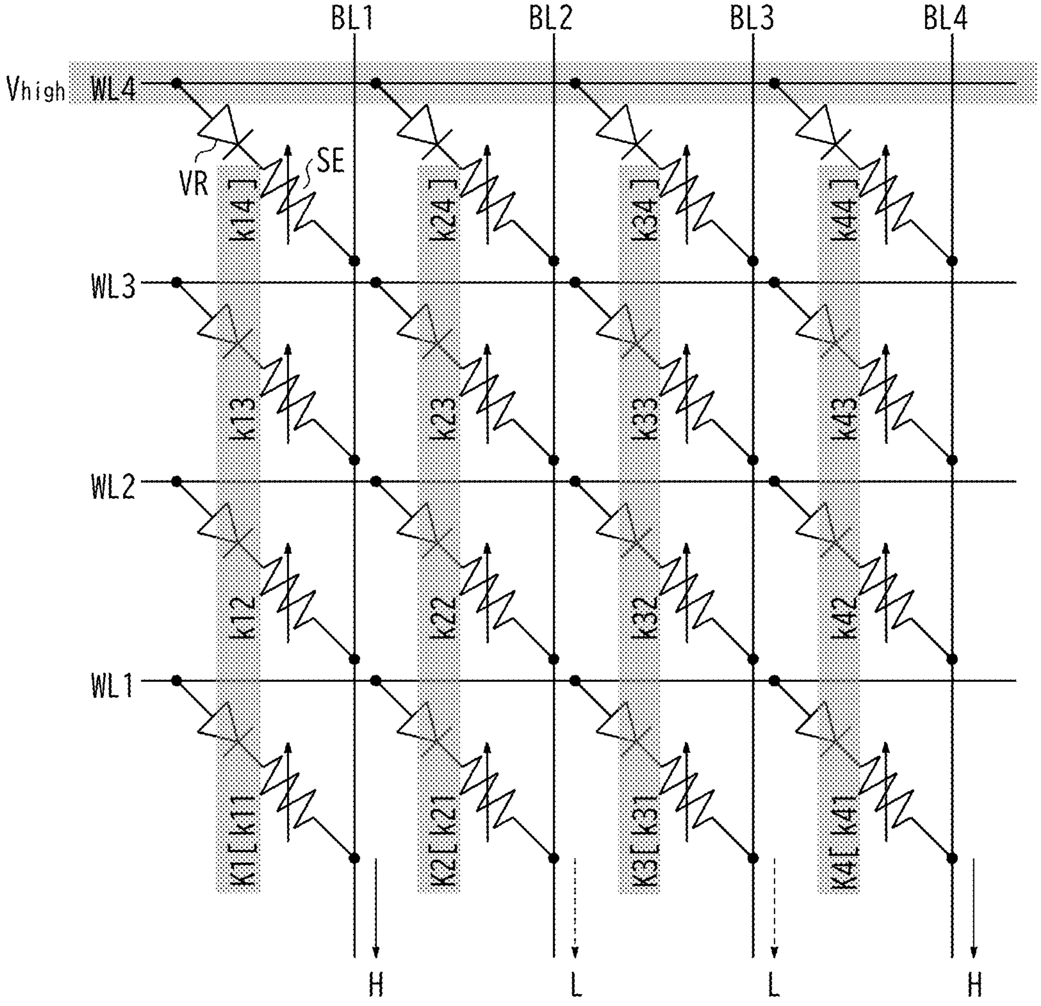
FIG. 15 is a diagram illustrating an example of driving a word line WL4 of FIG. 11.

After the word line WL3 is driven, the word line WL4 is driven as illustrated in FIG. 15. In this case, the high-level voltage Vhigh is applied to the word line WL4. In the example of FIG. 15, since the bits b1 of the first data K1 to K4 are (1, 0, 0, 1), respectively, the logics of the bit lines BL0 to BL3 become (H, L, L, H). Therefore, the bits b3 of the first data K1 and K4 match the bit b3 of the second data Q, and the bits b3 of the other first data K2 and K3 do not match the bit b3 of the second data Q.

In the examples of FIGS. 12 to 15, the first data K1 to K4 and the second data Q are compared for each bit, and the similarity is determined based on the number of matching bits. For example, since the first data K1 matches the second data Q in three bits among four bits, the similarity becomes 3. The first data K2 and K3 both have a similarity of 1, and the first data K4 has a similarity of 2. Therefore, in the examples of FIGS. 12 to 15, a result that the first data K1 is most similar to the second data Q is obtained.

The cross point-type memory illustrated in FIGS. 10 to 15 can be used for a process of at least one of the first determination unit 13 and the selection unit 14 in FIGS. 1 and 2.

As described above, in the present embodiment, the process of dividing the multi-dimensional first data K into two clusters while overlapping some of the first data K is repeated, and the centroid values of the plurality of clusters are compared with the second data Q in a state where the first data K equal to or less than the predetermined limit number is finally included in one cluster, and the cluster having the centroid value most similar to the second data Q is determined as the search cluster. Thereafter, all the first data K and the second data Q in the search cluster are compared, a predetermined number of pieces of first data K having high similarity are selected, and first data K similar to the second data Q is determined from the selected first data K. As a result, it is possible to quickly and accurately perform the similarity determination between the plurality of pieces of first data K and the second data Q.

In the present embodiment, comparison between the centroid values of a plurality of clusters and the second data Q and similarity determination between all the first data K and the second data Q in the search cluster can be performed by the CIM using the storage unit 2. Particularly, by setting the number of pieces of all the first data K in the search cluster to be equal to or smaller than the page size of the storage unit 2, the voltages of the plurality of bit lines BL1 to BLm can be varied according to the similarity between the plurality of pieces of first data K and the second data Q. Therefore, by sensing the voltages of the plurality of bit lines BL1 to BLm by the sense amplifier SA, it is possible to quickly perform the similarity determine between the plurality of pieces of first data K and the second data Q.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

The invention claimed is:

1. An information processing apparatus comprising:

a storage; and processing circuitry, wherein the storage includes:

a plurality of memory cells that store each bit of first data;

a plurality of first wirings that are connected to the plurality of memory cells and transmit a plurality of pieces of first data included in a search cluster; and a plurality of second wirings that are connected to the plurality of memory cells and transmit second data including a plurality of bits, wherein each of the plurality of first wirings outputs a voltage level corresponding to an inner product value between each of the plurality of pieces of first data and the second data, wherein a number of the first wirings is n, n being an integer greater than 1, and wherein the processing circuitry is configured to:

equally distribute the first data to a plurality of clusters while overlapping some of the first data among the plurality of pieces of first data and repeating distribution to a new set of a plurality of clusters until a number of pieces of the first data included in each of the distributed clusters becomes equal to or less than n;

calculate a centroid value of each of the finally distributed clusters;

compare a center of each of the plurality of clusters with second data and determine a cluster having a centroid value most similar to the second data as the search cluster; and compare each of the plurality of pieces of first data included in the search cluster with the second data to select one or more predetermined numbers of the first data similar to the second data.

2. The information processing apparatus according to claim 1, wherein the processing circuitry is further configured to:

determine the first data similar to the second data from the predetermined number of pieces of the selected first data.

3. The information processing apparatus according to claim 2, wherein a plurality of labels for identifying each of the plurality of pieces of first data are provided, and a label similar to the second data is determined based on a majority decision of a number of the labels determined to be similar to the second data among the predetermined number of pieces of the first data.

4. The information processing apparatus according to claim 3, wherein the processing circuitry is further configured to store the plurality of pieces of first data and the plurality of labels into the storage in association with each other, and a comparison process between the predetermined number of pieces of the first data and the second data is performed inside the storage.

5. The information processing apparatus according to claim 4, wherein the storage performs writing and reading with respect to the plurality of memory cells with a page size determined according to the numbers of the plurality of first wirings and the plurality of second wirings, and the number of the first wirings is a number of pieces of data equal to or smaller than the page size.

6. The information processing apparatus according to claim 4, wherein the plurality of first wirings are set to voltages corresponding to a similarity between each bit in each of the plurality of pieces of first data and a corresponding bit of the second data.

7. The information processing apparatus according to claim 6, wherein the predetermined number of pieces of the first data is selected based on the voltages of the plurality of first wirings.

8. The information processing apparatus according to claim 4, wherein the processing circuitry is further configured to store the plurality of pieces of first data in the storage.

9. The information processing apparatus according to claim 4, wherein a plurality of memory strings that are connected to the plurality of first wirings and the plurality of second wirings and to which two or more of the memory cells are connected in series are provided, and the plurality of memory strings cause a current corresponding to a similarity between each bit in each of the plurality of pieces of first data and a corresponding bit of the second data to flow.

10. The information processing apparatus according to claim 9, wherein the memory strings corresponding to the number of bits of the plurality of pieces of first data are connected to each of the plurality of first wirings, and each memory string causes a current corresponding to a comparison result between one bit of the corresponding first data and a corresponding bit of the second data to flow.

11. The information processing apparatus according to claim 9, wherein the storage compares each of the plurality of pieces of first data with the second data in parallel.

12. The information processing apparatus according to claim 9, wherein the memory cell is a NAND flash memory cell.

13. The information processing apparatus according to claim 4, wherein each of the plurality of memory cells stores a corresponding bit of the first data by a change in a resistance value.

14. The information processing apparatus according to claim 13, wherein by driving each of the plurality of second wirings with time shifted according to the second data, a current corresponding to an inner product value of each bit in each of the plurality of pieces of first data and corresponding bits of the second data is caused to flow through the plurality of first wirings.

15. The information processing apparatus according to claim 13, wherein the storage is a cross point-type memory.

16. The information processing apparatus according to claim 1, wherein the processing circuitry is further configured to repeat a process of distributing the plurality of pieces of first data into two clusters by soft clustering using non-negative matrix factorization (NMF).

17. The information processing apparatus according to claim 1, wherein the processing circuitry is further configured to repeat a process of generating one cluster using principal component analysis (PCA) and distributing the plurality of pieces of first data into two clusters.

18. The information processing apparatus according to claim 2, further comprising:

a host device configured to determines a label similar to the second data from among a predetermined number of labels corresponding to the first data.

19. A method performed by an information processing apparatus that includes:

a storage; and processing circuitry, wherein the storage includes:

a plurality of memory cells that store each bit of first data;

a plurality of first wirings that are connected to the plurality of memory cells and transmit a plurality of pieces of first data included in a search cluster; and a plurality of second wirings that are connected to the plurality of memory cells and transmit second data including a plurality of bits, wherein each of the plurality of first wirings outputs a voltage level corresponding to an inner product value between each of the plurality of pieces of first data and the second data, wherein a number of the first wirings is n, n being an integer greater than 1, and wherein the method comprises:

equally distributing, via the processing circuitry, the first data to a plurality of clusters while overlapping some of the first data among the plurality of pieces of first data and repeating distribution to a new set of a plurality of clusters until a number of pieces of the first data included in each of the distributed clusters becomes equal to or less than n;

calculating, via the processing circuitry, a centroid value of each of the finally distributed clusters;

comparing, via the processing circuitry, a center of each of the plurality of clusters with second data and determine a cluster having a centroid value most similar to the second data as the search cluster; and comparing, via the processing circuitry, each of the plurality of pieces of first data included in the search cluster with the second data to select one or more predetermined numbers of the first data similar to the second data.

20. The information processing apparatus according to claim 1, wherein the plurality of first wirings are bit lines.

21. The information processing apparatus according to claim 1, wherein n is an integer equal to or greater than 4, the first data includes m bits, m being an integer greater than n, and upon receipt of the first data, the processing circuitry is further configured to distribute the first data into the plurality of clusters each having n bits to cause a partial overlap between a first one of the clusters and a second one of the clusters.

* * * * *